US012011811B2

(12) United States Patent
Garces et al.

(10) Patent No.: US 12,011,811 B2
(45) Date of Patent: Jun. 18, 2024

(54) PUSHER MECHANISM FOR POWERED FASTENER DRIVER

(71) Applicant: MILWAUKEE ELECTRIC TOOL CORPORATION, Brookfield, WI (US)

(72) Inventors: Casey D. Garces, New Berlin, WI (US); Andrew P. Rux, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 109 days.

(21) Appl. No.: 17/544,642

(22) Filed: Dec. 7, 2021

(65) Prior Publication Data

US 2022/0088758 A1 Mar. 24, 2022

Related U.S. Application Data

(62) Division of application No. 16/376,632, filed on Apr. 5, 2019, now Pat. No. 11,224,960.

(Continued)

(51) Int. Cl.
*B25C 1/00* (2006.01)
*B25C 1/04* (2006.01)

(52) U.S. Cl.
CPC .............. *B25C 1/047* (2013.01); *B25C 1/003* (2013.01)

(58) Field of Classification Search
CPC ........... B25C 1/047; B25C 1/003; B25C 1/06; B25C 7/00

(Continued)

(56) References Cited

U.S. PATENT DOCUMENTS

| | | | |
|---|---|---|---|
| 966,462 | A | 8/1910 | Michel et al. |
| 1,397,176 | A | 11/1921 | Muth |

(Continued)

FOREIGN PATENT DOCUMENTS

| | | | |
|---|---|---|---|
| DE | 10125846 | A1 | 12/2001 |
| EP | 1737621 | B1 | 12/2008 |

(Continued)

OTHER PUBLICATIONS

Stanley, "Bostitch Contruction Tools and Fasteners Catalog," <http://manualzz.com/doc/1349102/construction-staplers> 2001, 60 pages.

(Continued)

*Primary Examiner* — Robert F Long
(74) *Attorney, Agent, or Firm* — Michael Best & Friedrich LLP

(57) ABSTRACT

A powered fastener driver includes a housing, a nosepiece coupled to the housing and extending therefrom, a driver blade, a canister magazine coupled to the nosepiece, a pusher mechanism coupled to the nosepiece, and a cam. The pusher mechanism includes a body coupled to the nosepiece, a feeder arm pivotably coupled to the body, and a lever pivotably coupled to the nosepiece. The lever has a first end that is engageable with the body for imparting reciprocating translation to the body relative to the nosepiece in response to pivoting movement of the lever in opposite directions about the pivot axis. A cam is engaged with a second end of the lever for imparting pivoting movement to the lever. The feeder arm is engageable with individual fasteners in the nosepiece for sequentially pushing the fasteners into the driver channel in response to reciprocation of the body relative to the nosepiece.

20 Claims, 11 Drawing Sheets

Related U.S. Application Data

(60) Provisional application No. 62/779,809, filed on Dec. 14, 2018, provisional application No. 62/657,357, filed on Apr. 13, 2018.

(58) Field of Classification Search
USPC .................................................. 227/119–156
See application file for complete search history.

(56) References Cited

U.S. PATENT DOCUMENTS

| | | | | |
|---|---|---|---|---|
| 1,554,686 | A | 9/1925 | Muth | |
| 3,267,616 | A * | 8/1966 | Stahn | B24B 3/18 451/48 |
| 3,330,462 | A | 7/1967 | Colechia et al. | |
| 3,552,627 | A * | 1/1971 | Moreno | B25C 1/005 227/120 |
| 3,554,233 | A | 1/1971 | Korth | |
| 3,688,966 | A | 9/1972 | Perkins et al. | |
| 3,961,408 | A | 6/1976 | Goodsmith et al. | |
| 4,146,071 | A | 3/1979 | Mueller et al. | |
| 4,389,012 | A | 6/1983 | Grikis et al. | |
| 4,389,102 | A | 6/1983 | Grikis et al. | |
| 4,442,965 | A | 4/1984 | Leistner | |
| 4,463,888 | A | 8/1984 | Geist et al. | |
| 4,600,135 | A * | 7/1986 | Mukoyama | B25C 1/003 227/120 |
| 4,942,996 | A | 7/1990 | Wolfberg et al. | |
| 5,038,993 | A * | 8/1991 | Schafer | B25C 1/005 227/103 |
| 5,322,189 | A * | 6/1994 | Oda | B25C 1/005 227/120 |
| 5,570,618 | A | 11/1996 | Habermehl et al. | |
| 5,683,024 | A | 11/1997 | Eminger et al. | |
| 5,720,423 | A * | 2/1998 | Kondo | B25C 1/06 227/132 |
| 5,855,151 | A | 1/1999 | Habermehl | |
| 5,934,162 | A | 8/1999 | Habermehl | |
| 5,975,900 | A * | 11/1999 | Garman | A61C 1/185 433/105 |
| 6,109,474 | A | 8/2000 | Haugen | |
| 6,672,498 | B2 | 1/2004 | White et al. | |
| 6,966,476 | B2 | 11/2005 | Jalbert et al. | |
| 7,137,186 | B2 | 11/2006 | Wojcicki et al. | |
| 7,225,962 | B2 | 6/2007 | Porth et al. | |
| 7,455,207 | B2 | 11/2008 | Wojcicki et al. | |
| 7,699,201 | B2 | 4/2010 | Hagan et al. | |
| 7,866,521 | B2 | 1/2011 | Gross et al. | |
| 7,950,556 | B2 | 5/2011 | Hagan | |
| 8,011,441 | B2 | 9/2011 | Leimbach et al. | |
| 8,051,919 | B2 | 11/2011 | Hagan et al. | |
| 8,276,798 | B2 | 10/2012 | Moeller et al. | |
| 8,302,832 | B2 | 11/2012 | Porth et al. | |
| 8,636,185 | B2 | 1/2014 | Largo et al. | |
| 8,925,780 | B2 * | 1/2015 | Largo | B25C 1/08 227/138 |
| 8,931,677 | B2 | 1/2015 | Porth et al. | |
| 10,549,412 | B2 | 2/2020 | McCardle et al. | |
| 11,413,735 | B2 | 8/2022 | Akiba et al. | |
| 2003/0230621 | A1 | 12/2003 | Yamamoto et al. | |
| 2006/0118596 | A1 | 6/2006 | Wojcicki et al. | |
| 2006/0186171 | A1 | 8/2006 | Porth et al. | |
| 2006/0283909 | A1 | 12/2006 | Shima et al. | |
| 2007/0267458 | A1 | 11/2007 | Chen | |
| 2008/0179372 | A1 | 7/2008 | Kurth et al. | |
| 2008/0251559 | A1 | 10/2008 | Uejima et al. | |
| 2008/0290129 | A1 * | 11/2008 | Schell | B25C 5/1665 227/129 |
| 2009/0090759 | A1 * | 4/2009 | Leimbach | B25C 1/06 227/10 |
| 2009/0114697 | A1 | 5/2009 | Gross et al. | |
| 2009/0255973 | A1 | 10/2009 | Tamura et al. | |
| 2010/0176175 | A1 | 7/2010 | Tamura et al. | |
| 2011/0049215 | A1 | 3/2011 | McAfee et al. | |
| 2011/0315738 | A1 | 12/2011 | Liu et al. | |
| 2012/0118932 | A1 * | 5/2012 | Largo | B25C 1/008 227/8 |
| 2012/0318550 | A1 * | 12/2012 | Tanimoto | B25B 23/1475 173/117 |
| 2016/0023342 | A1 * | 1/2016 | Koenig | B25C 1/06 173/124 |
| 2016/0288305 | A1 * | 10/2016 | McCardle | B25C 1/047 |
| 2016/0333964 | A1 * | 11/2016 | Scekic | B25B 13/5016 |
| 2017/0239800 | A1 * | 8/2017 | Moore | B25C 7/00 |
| 2017/0361444 | A1 | 12/2017 | Namouz | |
| 2018/0126528 | A1 * | 5/2018 | Pomeroy | B25C 5/13 |
| 2019/0314967 | A1 | 10/2019 | Garces et al. | |
| 2020/0189080 | A1 | 6/2020 | Aizawa et al. | |
| 2020/0290190 | A1 * | 9/2020 | Pomeroy | B25C 1/047 |
| 2020/0306941 | A1 | 10/2020 | Akiba et al. | |
| 2021/0347022 | A1 | 11/2021 | Leathrum et al. | |

FOREIGN PATENT DOCUMENTS

| | | | |
|---|---|---|---|
| JP | S5356182 | U | 5/1978 |
| JP | S54133681 | A | 10/1979 |
| JP | S54133682 | A | 10/1979 |
| JP | S54136477 | A | 10/1979 |
| JP | S54136478 | A | 10/1979 |

OTHER PUBLICATIONS

Stanley, "Bostitch CRN38K Cordless Roofing Nailer Manual," <http://ec1.images-amazon.com/media/i3d/01/A/man-migrate/MANUAL000004903.pdf> 2000, 10 pages.

Milwaukee Electric Tool, "Coil Roofing Nailer Service Parts List," 2015, 4 pages.

International Search Report and Written Opinion for Application No. PCT/US2019/026043 dated Jul. 23, 2019 (11 pages).

International Search Report and Written Opinion for Application No. PCT/US2021/031018 dated Sep. 3, 2021 (15 pages).

Extended European Search Report for Application No. 19785818.6 dated Jan. 28, 2022 (9 pages).

* cited by examiner

PUSHER MECHANISM FOR POWERED FASTENER DRIVER

CROSS-REFERENCE TO RELATED APPLICATIONS

This application is a divisional of U.S. patent application Ser. No. 16/376,632 filed on Apr. 5, 2019, now U.S. Pat. No. 11,224,960, which claims priority to U.S. Provisional Patent Application No. 62/779,809 filed on Dec. 14, 2018 and U.S. Provisional Patent Application No. 62/657,357 filed on Apr. 13, 2018, the entire contents of which are incorporated herein by reference.

FIELD OF THE INVENTION

The present invention relates to powered fastener drivers, and more specifically to pusher mechanisms for powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver including a housing, a nosepiece coupled to the housing and extending therefrom, a driver blade, a canister magazine coupled to the nosepiece, a pusher mechanism coupled to the nosepiece, and a cam. The driver blade is movable within the nosepiece between a ready position and a driven position. The nosepiece receives collated fasteners therein. The pusher mechanism individually transfers collated fasteners in the canister magazine to a driver channel in the nosepiece in which the driver blade is movable. The pusher mechanism includes a body coupled to the nosepiece, a feeder arm pivotably coupled to the body for movement therewith, and a lever pivotably coupled to the nosepiece about a pivot axis. The body relatively translates with the nosepiece. The lever has a first end that is engageable with the body for imparting reciprocating translation to the body relative to the nosepiece in response to pivoting movement of the lever in opposite directions about the pivot axis. The cam is engages with a second end of the lever for imparting pivoting movement to the lever. The feeder arm is engageable with individual fasteners in the nosepiece for sequentially pushing the fasteners into the driver channel in response to reciprocation of the body relative to the nosepiece.

The present invention provides, in another aspect, a powered fastener driver including a housing, a motor positioned in the housing, a nosepiece coupled to the housing and extending therefrom, a driver blade, a canister magazine coupled to the nosepiece, a lifting mechanism positioned within the housing, a pusher mechanism coupled to the nosepiece, a cam, and a gear train. The driver blade is movable within the nosepiece between a ready position and a driven position. The nosepiece receives collated fasteners from the canister magazine. The lifting mechanism is operable to move the driver blade from the driven position toward the ready position. The pusher mechanism individually transfers collated fasteners in the canister magazine to a driver channel in the nosepiece in which the driver blade is movable. The pusher mechanism includes a body coupled to the nosepiece, a feeder arm pivotably coupled to the body for relative movement therewith, and a lever pivotably coupled to the nosepiece about a pivot axis. The body relatively translates with the nosepiece. The lever has a first end that is engageable with the body for translating the body relative to the nosepiece in response to pivoting movement of the lever in opposite directions about the pivot axis, and an opposite, second end. The cam is engages with a second end of the lever. The gear train is operable to receive torque from the motor and distribute torque to the lifting mechanism and the cam, causing the cam to rotate and impart pivoting movement to the lever, which translates the body of the pusher mechanism relative to the nosepiece. The feeder arm is engageable with individual fasteners in the nosepiece for sequentially pushing the fasteners into the driver channel in response to reciprocation of the body relative to the nosepiece.

The present invention provides, in a further aspect, a powered fastener driver including a housing, a nosepiece coupled to the housing and extending therefrom, a driver blade, a canister magazine coupled to the nosepiece, and a pusher mechanism coupled to the nosepiece. The driver blade is movable within the nosepiece between a ready position and a driven position. The nosepiece receives collated fasteners from the canister magazine. The pusher mechanism individually transfers collated fasteners in the canister magazine to a driver channel in the nosepiece in which the driver blade is movable. The pusher mechanism includes a body that is slidably coupled to the nosepiece, a feeder arm pivotably coupled to the body for movement therewith, and a solenoid. The body relatively translates with the nosepiece. The solenoid includes a solenoid housing and a plunger extending therefrom. The plunger is coupled to the body for imparting reciprocating translation to the body in response to activation and deactivation of the solenoid. The canister includes a mount portion to which the solenoid housing is coupled.

Additional features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
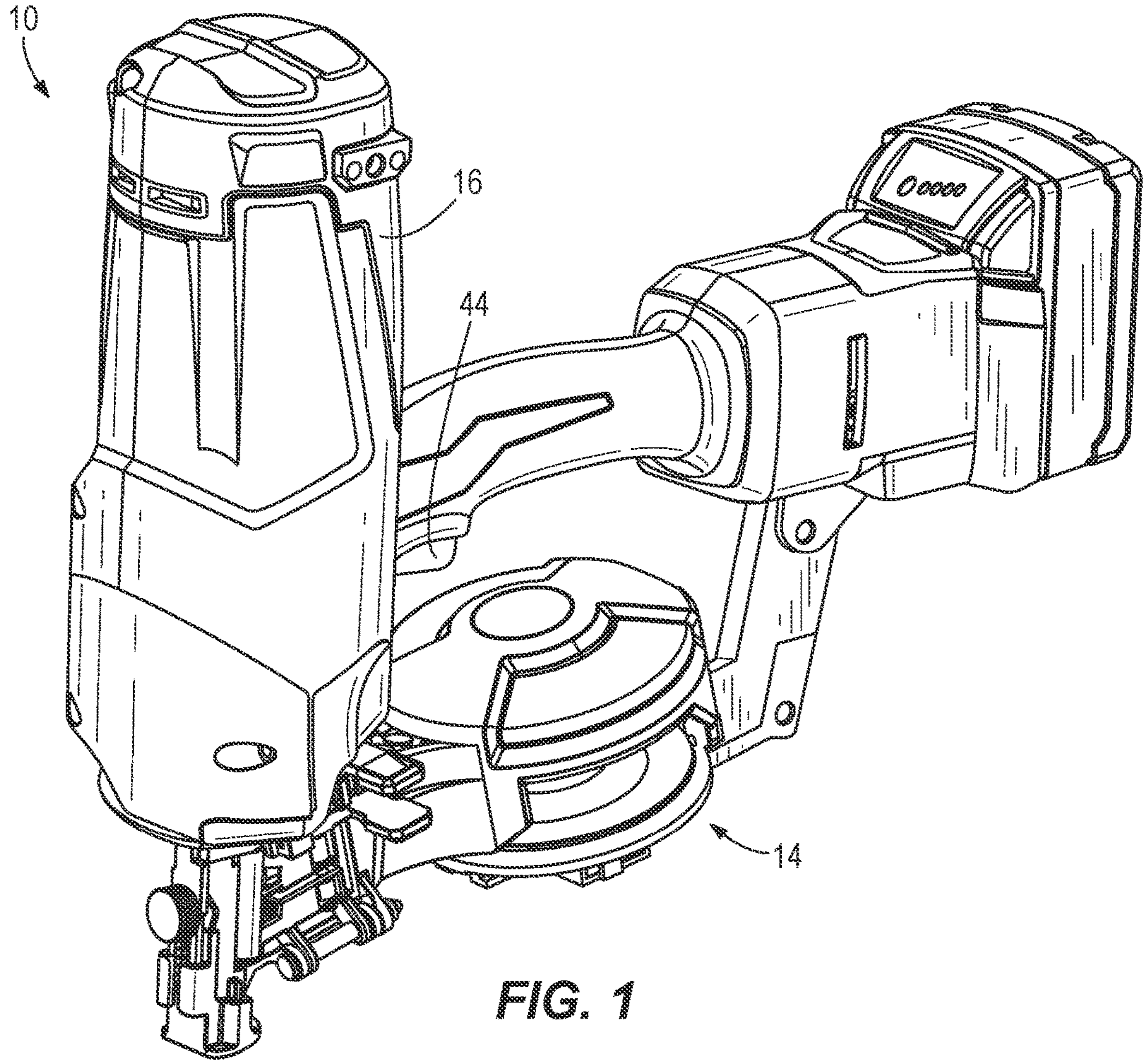
FIG. 1 is a perspective view of a powered fastener driver in accordance with an embodiment of the invention.
Figure 2:
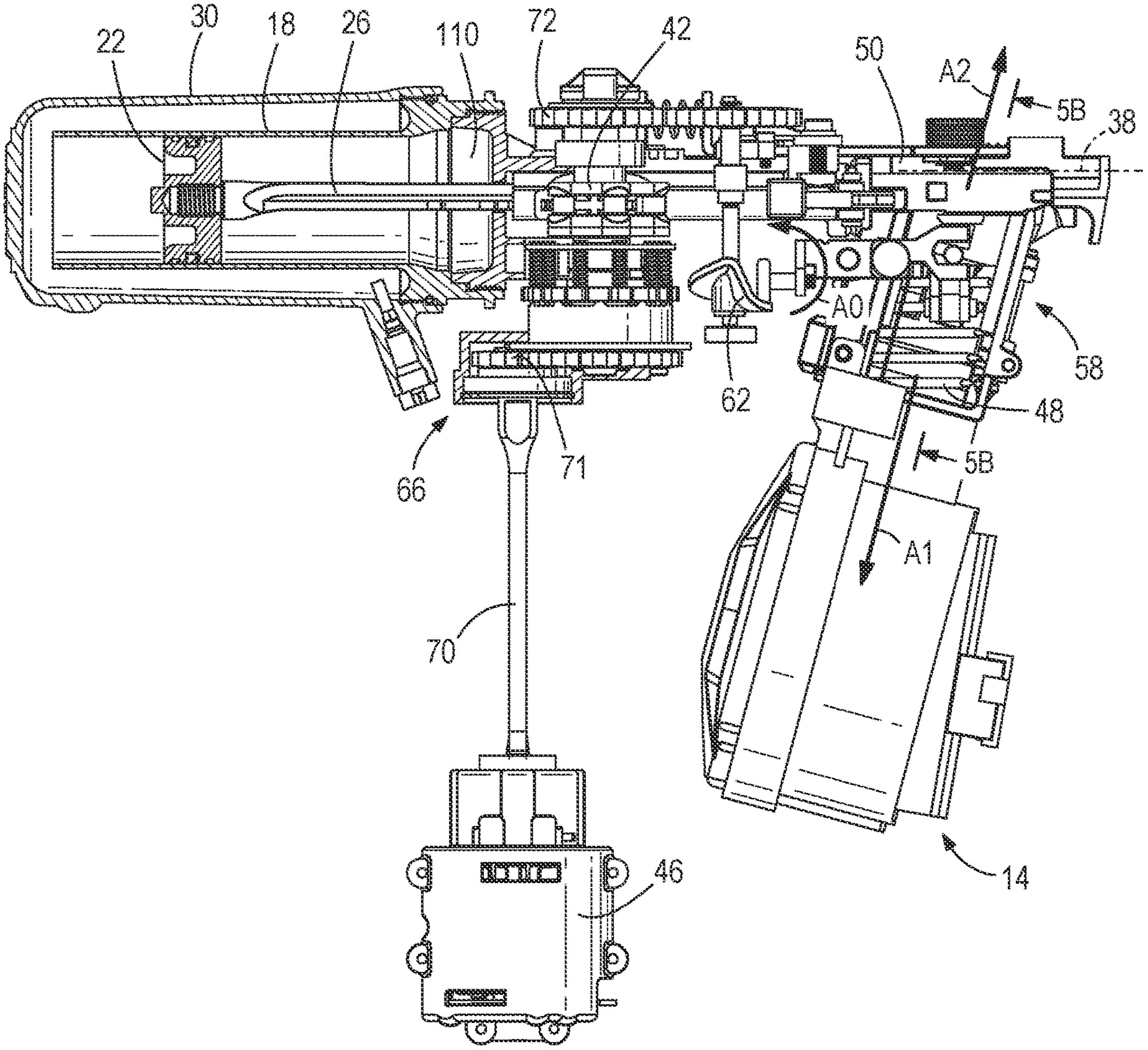
FIG. 2 is a plan view of the fastener driver of FIG. 1, with the housing removed, illustrating a pusher mechanism.

With reference to FIGS. 1 and 2, a gas spring-powered fastener driver 10 is operable to drive fasteners (e.g., nails) held within a canister magazine 14 into a workpiece. The fastener driver 10 includes a housing 16, a cylinder 18 positioned within the housing 16, and a moveable piston 22 positioned within the cylinder 18. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30.

With reference to FIG. 2, the cylinder 18 and the driver blade 26 define a driving axis 38, and during a driving cycle the driver blade 26 and piston 22 are moveable between a ready position (i.e., top dead center) and a driven position (i.e., bottom dead center). The fastener driver 10 further includes a lifting mechanism 42, which is powered by a motor 46, and which is operable to move the driver blade 26 from the driven position to the ready position.

In operation, the lifting mechanism 42 drives the piston 22 and the driver blade 26 to the ready position by energizing the motor 46. As the piston 22 and the driver blade 26 are driven to the ready position, the gas above the piston 22 and the gas within the storage chamber cylinder 30 is compressed. Once in the ready position, the piston 22 and the driver blade 26 are held in position until released by user activation of a trigger 44. When released, the compressed gas above the piston 22 and within the storage chamber 30 drives the piston 22 and the driver blade 26 to the driven position, thereby driving a fastener into a workpiece. The illustrated fastener driver 10 therefore operates on a gas spring principle utilizing the lifting assembly 42 and the piston 22 to further compress the gas within the cylinder 18 and the storage chamber cylinder 30.

Figure 3:
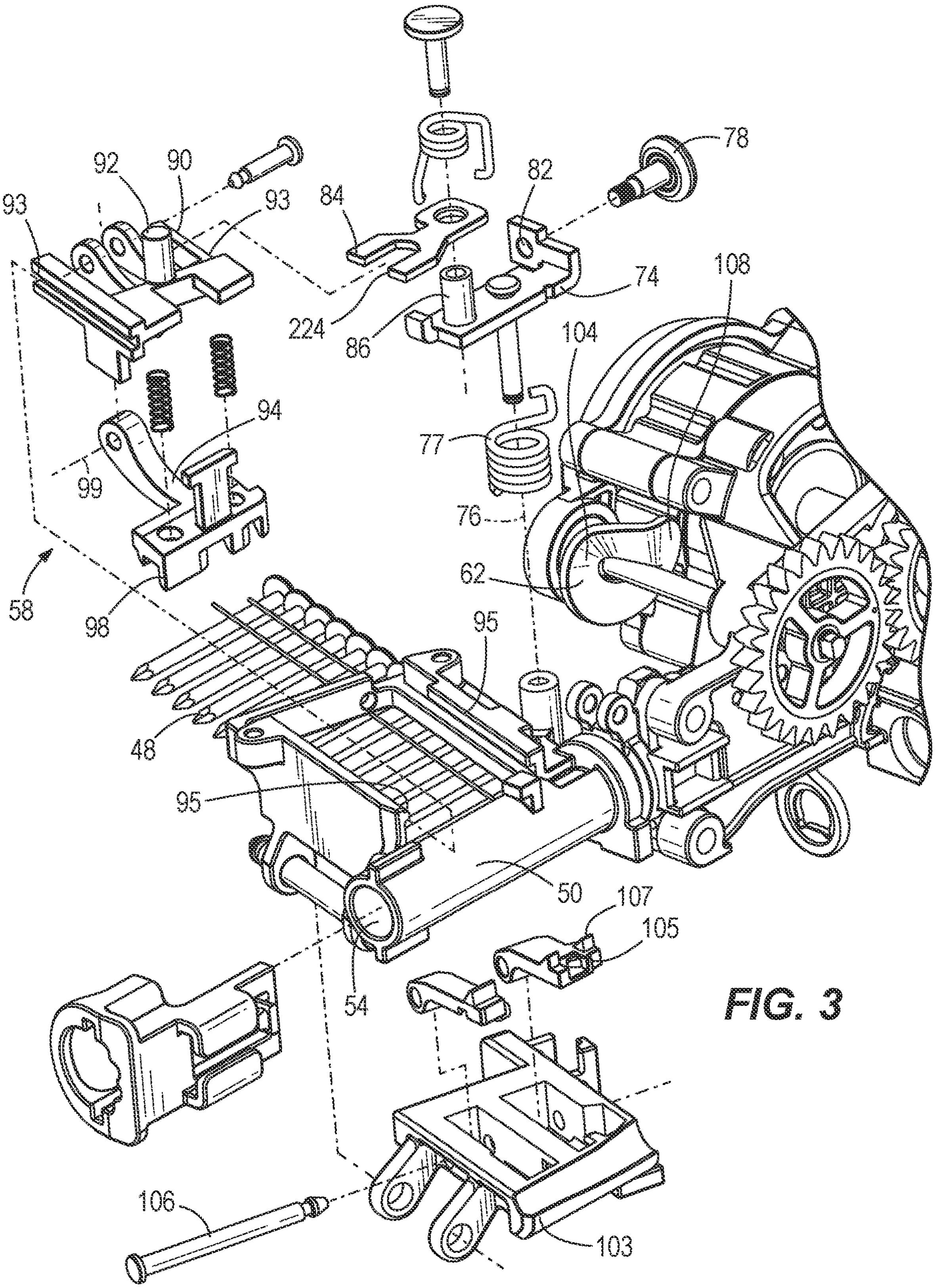
FIG. 3 is an exploded front perspective view of the pusher mechanism of FIG. 2.
Figure 4:
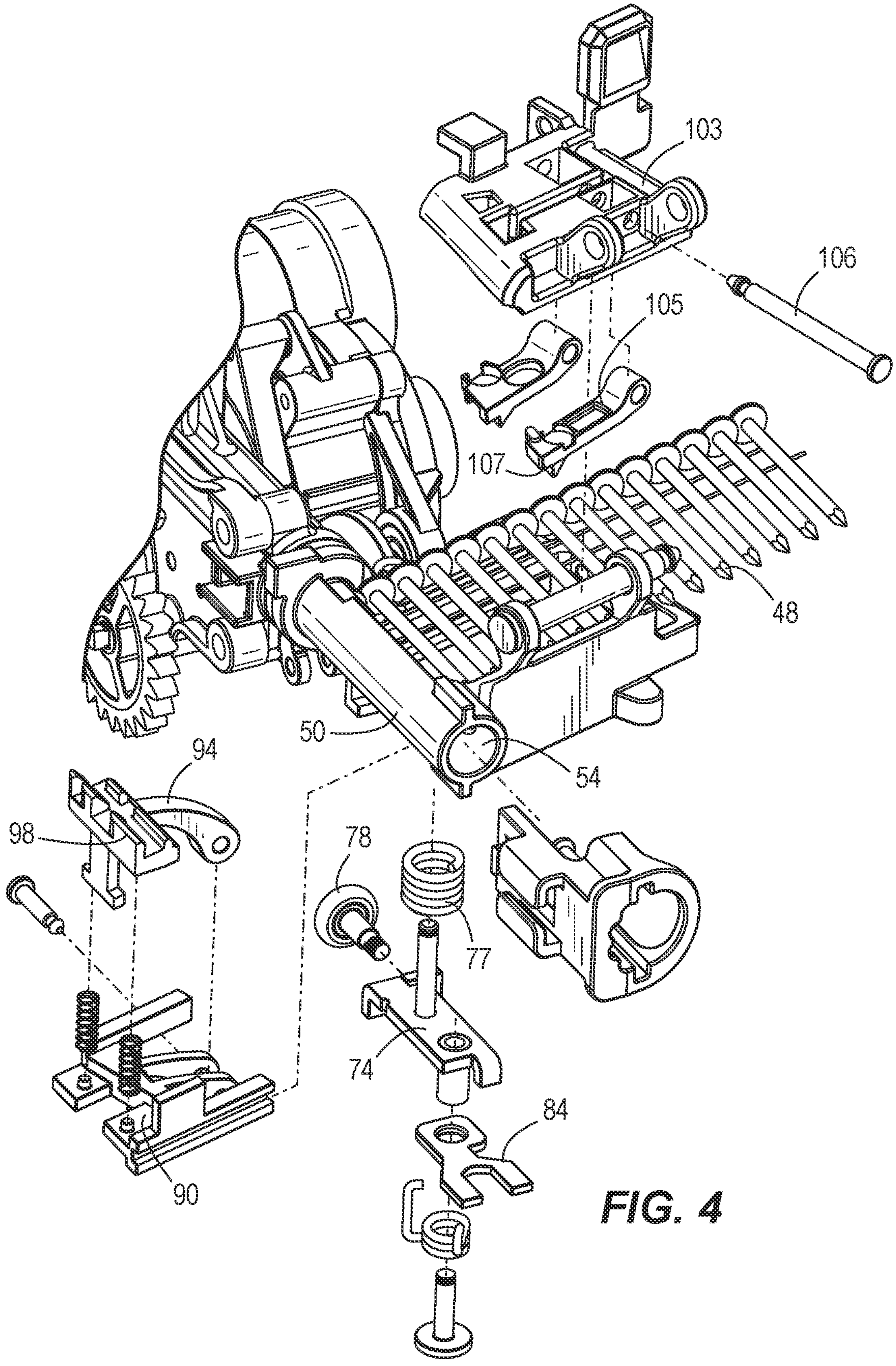
FIG. 4 is another exploded front perspective view of the pusher mechanism of FIG. 2.

The canister magazine 14 includes collated fasteners 48 arranged in a coil. The magazine 14 is coupled to a nosepiece 50 in which the fasteners 48 are received (FIGS. 3-4). The fasteners 48 are sequentially transferred or loaded from the magazine 14 to a driver channel 54 in the nosepiece 50 by a pusher mechanism 58. After the fastener 48 is inserted into the driver channel 54, the driver blade 26 is movable within the driver channel 54 to discharge the fastener 48 into a workpiece.

With reference to FIGS. 2 and 3, the pusher mechanism 58 is driven in sync with the lifting mechanism 42 by a gear train 66 coupled to a transmission output shaft 70 and a cam 62 that receives torque from the gear train 66, causing the cam 62 to rotate in unison with the lifting mechanism 42. The gear train 66 consists of a first gear set 71 on the nosepiece 50 that imparts rotational motion onto a second gear set 72. The pusher mechanism 58 includes a sliding body 90 coupled to the nosepiece 50 for relative translation therewith. The sliding body 90 includes a slot 93 in which guide rails 95 on the nosepiece 50 are received. The motion of the sliding body 90 is constrained to reciprocating linear movement in the direction of arrows A1, A2 (shown in FIG. 2) that are parallel with the guide rails 95 relative to the magazine 14.

The pusher mechanism 58 further includes a feeder arm 94 that is pivotably coupled to the sliding body 90 about a pivot axis 99 that is perpendicular to the direction of movement of the sliding body 90 along arrows A1, A2. Because the feeder arm 94 is supported upon the sliding body 90, the feeder arm 94 reciprocates with the sliding body 90 in the direction of arrows A1, A2 in response to reciprocating pivoting movement of the lever 74.

Figure 5A:
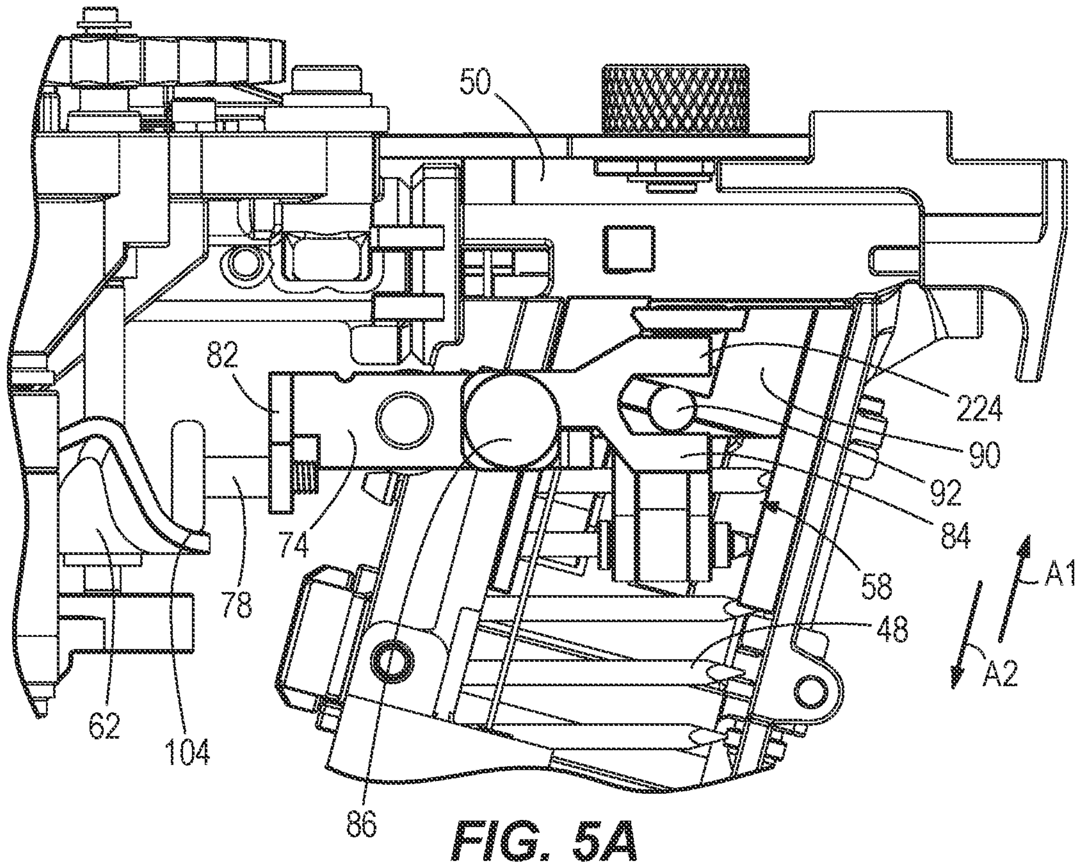
FIG. 5A is a plan view of the pusher mechanism of FIG. 2 at the beginning of a firing cycle.
Figure 5B:
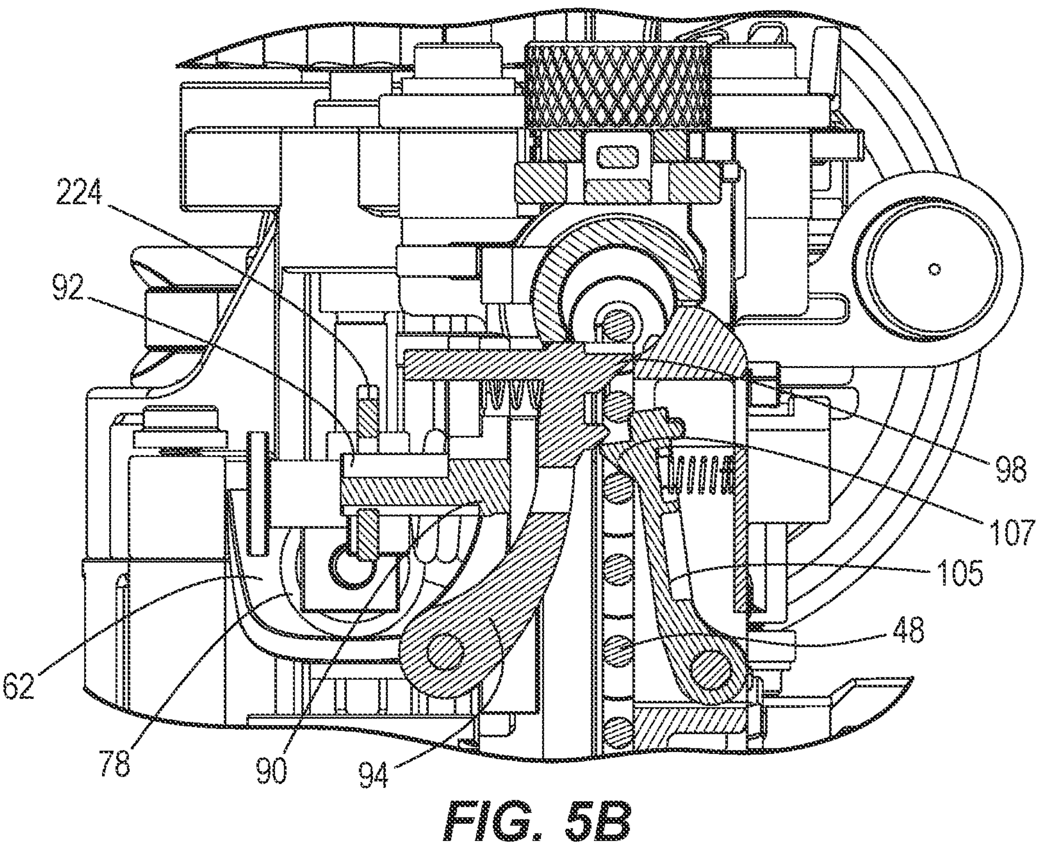
FIG. 5B is a cross-sectional view of the pusher mechanism of FIG. 5A at the beginning of a firing cycle.

Prior to initiation of a firing cycle, a forward-most fastener 48 is positioned in the driver channel 54, the sliding body 90 is located in a forward-most position relative to the nosepiece 50, and the feeder arm 94 is pivoted to an inboard position to thereby receive one of the fasteners 48 behind the forward-most fastener 48 in aligned notches 98 in the feeder arm 94 (FIGS. 4 and 5B). The forward-most position of the sliding body 90 coincides with the roller 78 being in contact with a valley 104 on the cam 62 (shown in FIG. 2).

Figure 6A:
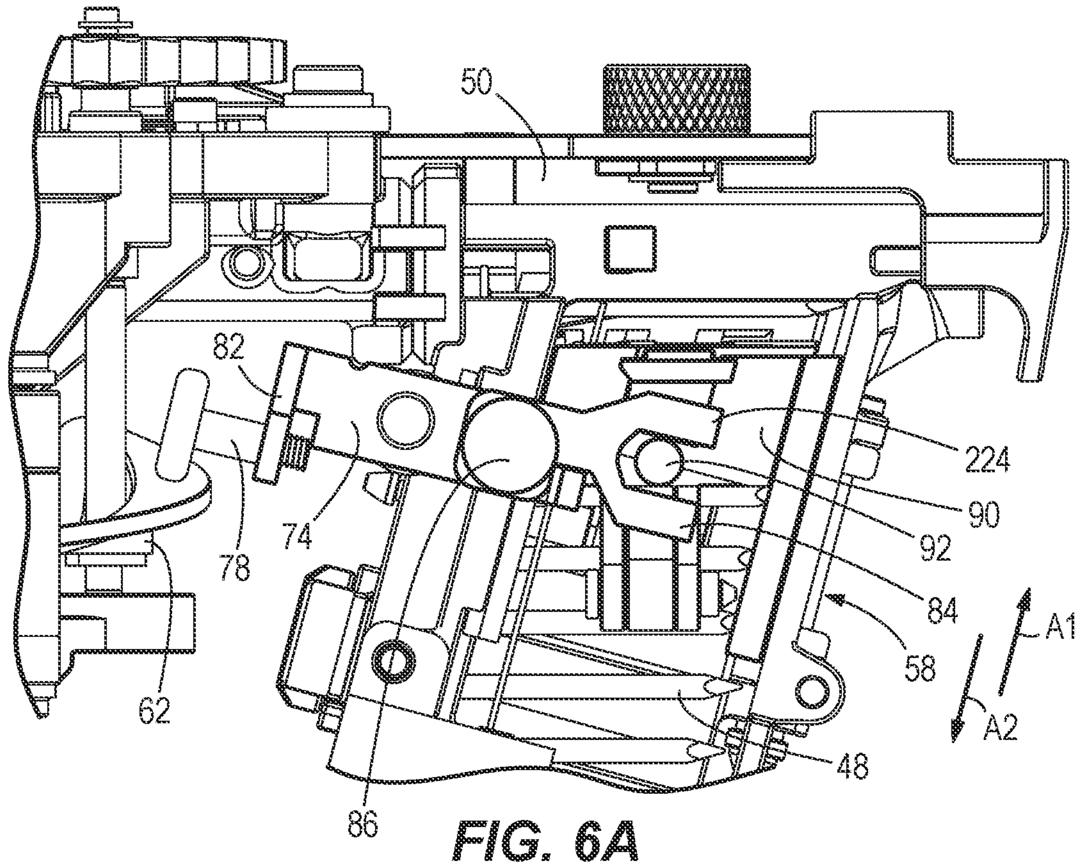
FIG. 6A is a plan view of the pusher mechanism of FIG. 2 during the firing cycle.
Figure 6B:
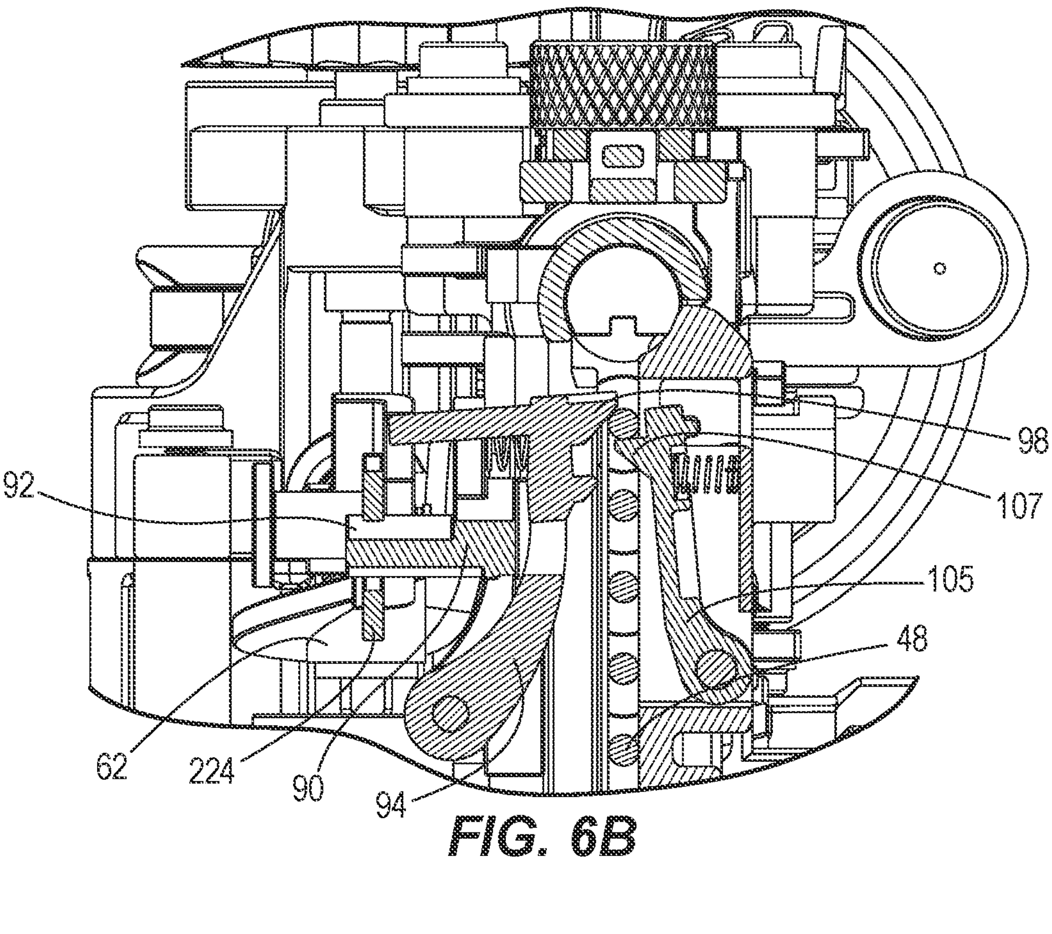
FIG. 6B is a cross-sectional view of the pusher mechanism of FIG. 6A during the firing cycle.
Figure 7A:
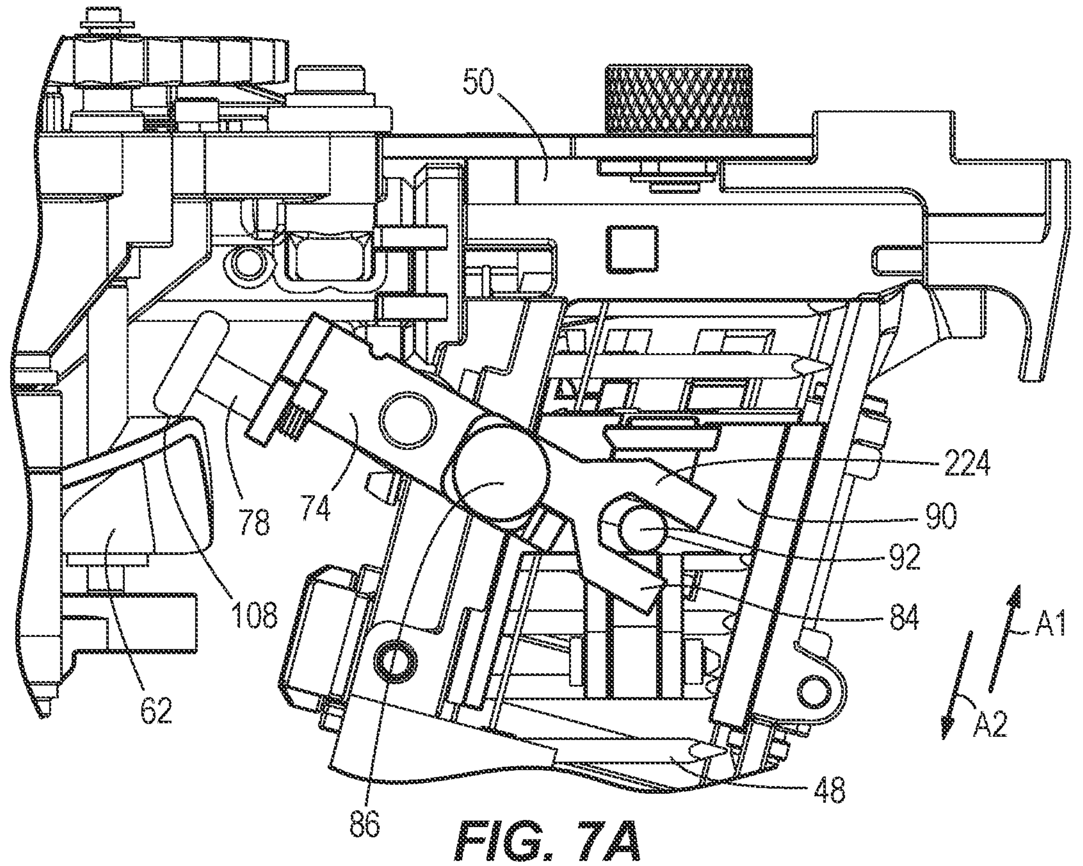
FIG. 7A is a plan view of the pusher mechanism of FIG. 2 during the firing cycle.
Figure 7B:
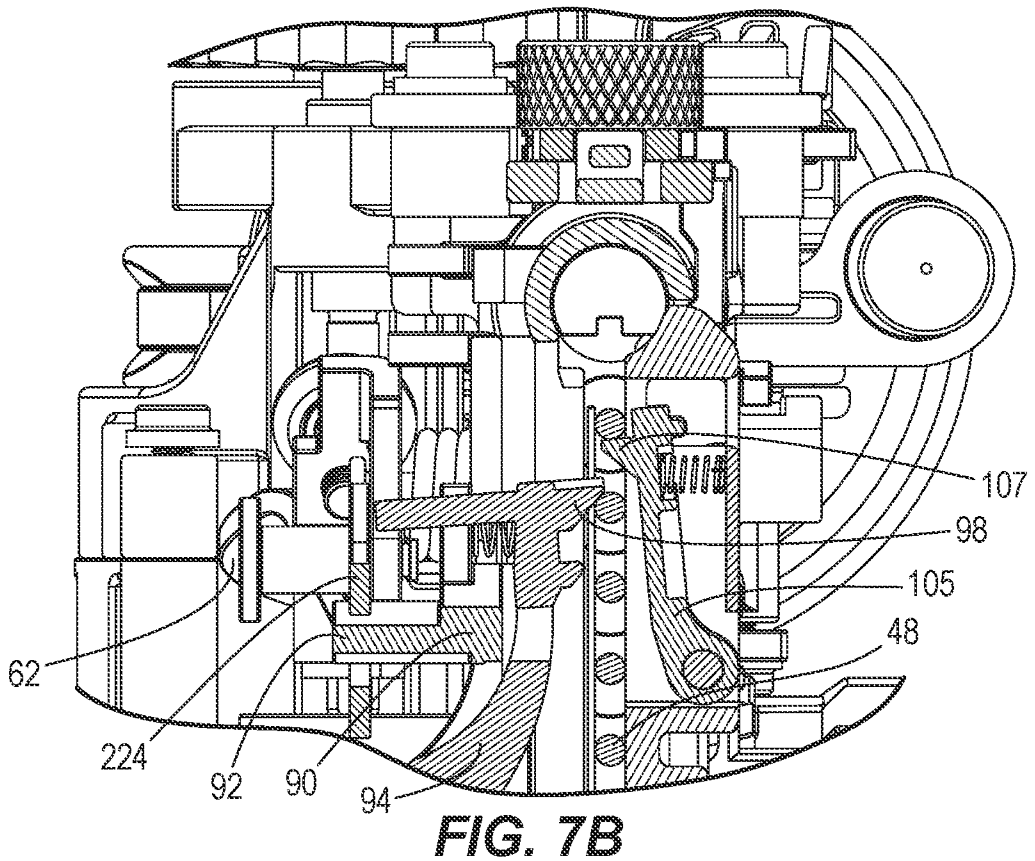
FIG. 7B is a cross-sectional view of the pusher mechanism of FIG. 7A during the firing cycle.
Figure 8A:
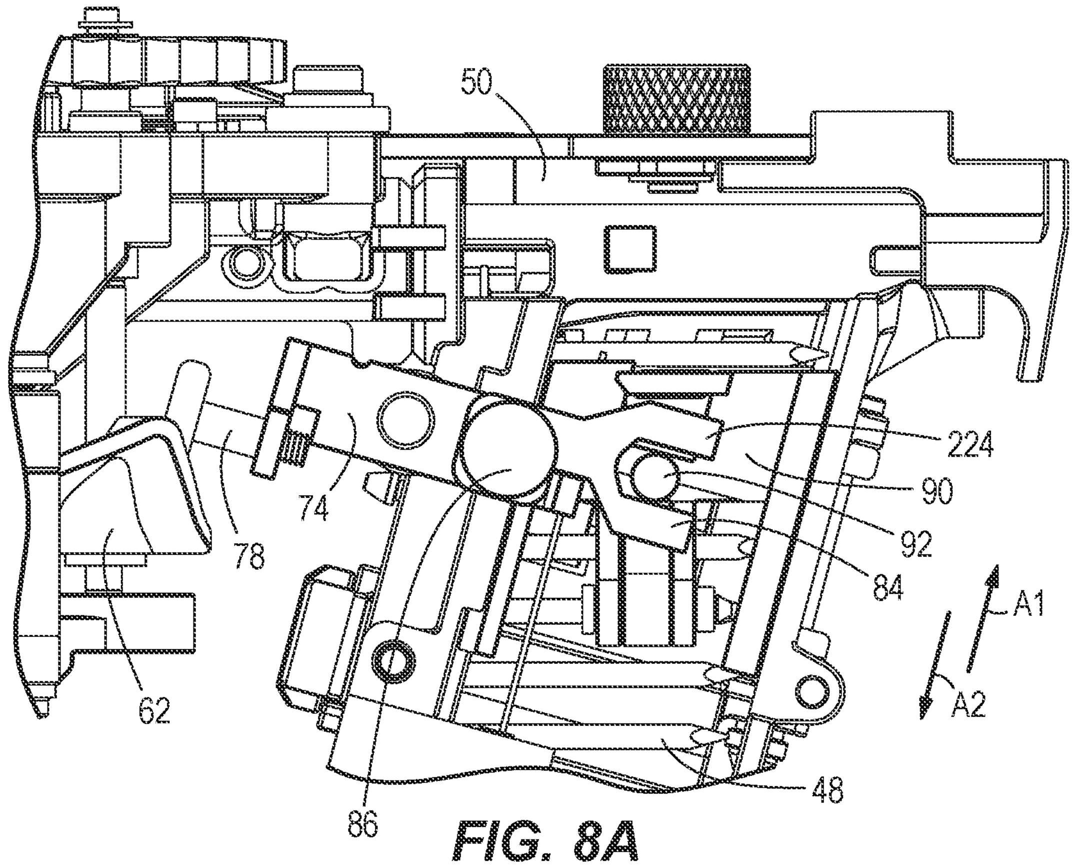
FIG. 8A is a plan view of the pusher mechanism of FIG. 2 at the end of the firing cycle.
Figure 8B:
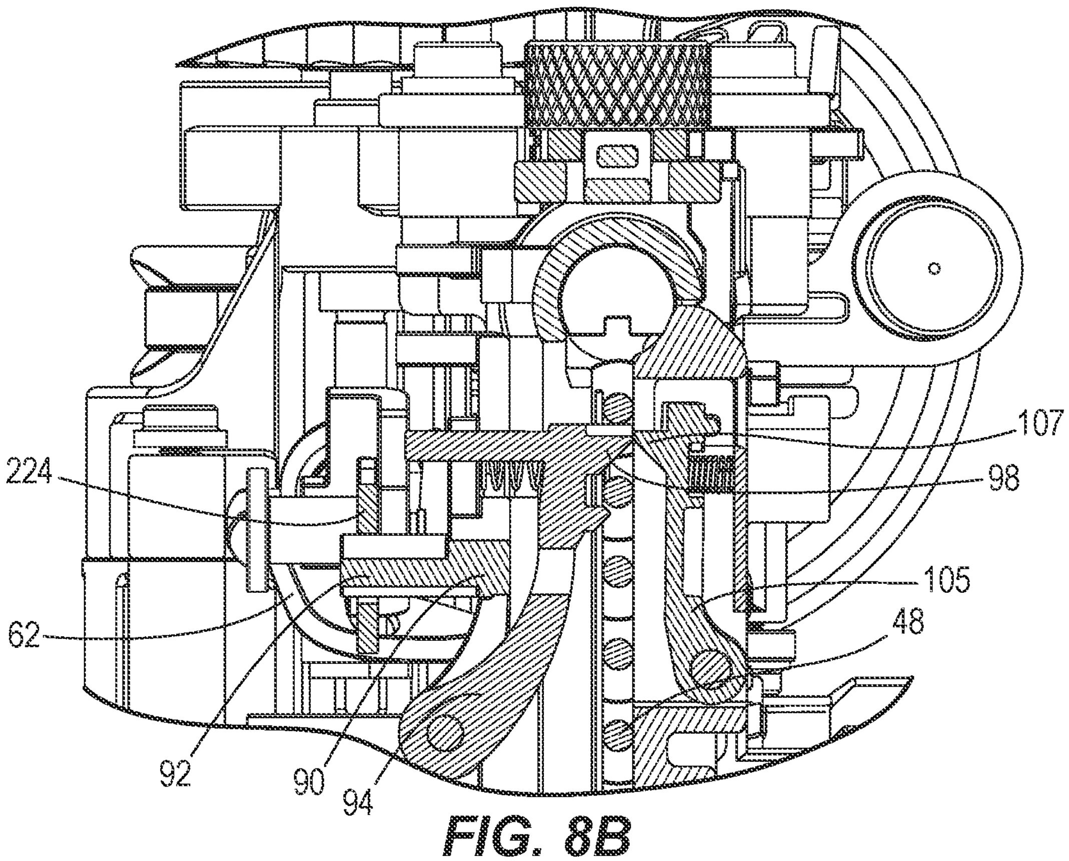
FIG. 8B is a cross-sectional view of the pusher mechanism of FIG. 8A at the end of the firing cycle.

With reference to FIGS. 3 and 4, check pawls 105 are pivotably coupled to a shaft 106 carried on a nosepiece access door 103, which is pivotably coupled to the nosepiece 50. Each check pawl 105 includes a finger 107 that is in contact with the fasteners 48. Springs (FIG. 5B) bias the respective check pawls 105 toward the fasteners 48 to maintain the fingers 107 in contact with the fasteners 48 as the fasteners 48 are advanced toward the nosepiece 50. In operation, as the feeder arm 94 is retracted in the direction A1 (FIG. 6B), the fingers 107 of the respective check pawls 105 remain engaged with one of the collated fasteners 48 while the feeder arm 94 pivots around the same fastener 48. After clearing the fastener 48, the feeder arm 94 pivots toward an inboard position and behind the fastener 48 (FIG. 7B). As the feeder arm 94 moves the fastener 48 to the driver channel 54, the check pawls 105 are biased away from the fasteners 48 to allow the collated fasteners 48 to advance (FIG. 8B). The springs biasing the respective check pawls 105 then rebound, positioning the check pawls 105 between the next two fasteners 48 in the sequence, preventing backwards movement of the collated fasteners 48 toward the canister magazine 14 (FIG. 6B).

When a firing cycle is initiated (e.g., by a user pulling a trigger 44 of the fastener driver 10), the motor 46 is activated to rotate the lifting mechanism 42, which releases the driver blade 26, permitting the gas in the storage chamber cylinder 30 to expand and push the piston 22 downward into the cylinder 18. Prior to the piston 22 reaching the bottom dead center position in the cylinder 18, the driver blade 26 impacts the fastener 48 in the driver channel 54, discharging the fastener 48 from the nosepiece 50 and into the workpiece. During this time, the lifting mechanism 42 continues to rotate (i.e, by the motor 46 providing torque to the transmission output shaft 70), returning the piston 22 and driver blade 26 to the ready position in the cylinder 18. Simultaneously, the rotating transmission output shaft 70 and gear train 66 rotates the cam 62.

The cam 62 rotates nearly 360 degrees, causing the roller 78 to follow the cam 62 as the cam surface transitions from the valley 104 to a peak 108 (FIGS. 5A, 6A, and 7A), imparting pivoting movement to the lever 74 about the axis 76 in a direction opposite the arrow A0 (FIG. 2). As the lever 74 pivots, the fork 84 pushes the protruding pin 92 of the sliding body 90, converting the pivoting motion of the lever 74 to linear motion of the body 90 (FIG. 6A). As the body 90 slides away from the driver channel 54 in the direction of A1, the feeder arm 94 pivots to clear the next fastener in the sequence (FIGS. 6A and 6B). At this time, the check pawls 105 remain engaged with one of the fasteners 48, preventing the collated fasteners 48 from being driven rearward toward the canister magazine 14. When the body 90 is at a position farthest from the driver channel 54 (i.e., when the body 90 changes the direction of translation from A1 to A2), the springs biases the feeder arm 94 behind the next fastener 48 in the sequence (FIGS. 7A and 7B). Then, continued rotation of the cam 62 causes the roller 78 to transition from the peak 108 back to the valley 104, allowing the torsion spring 77 acting on the lever 74 to rebound, pivoting the lever 74 in the direction of arrow A0 and moving the fork 84 and, thus, the body 90 forward. Forward motion of the body 90 toward the driver channel 54 in the direction of A2 moves the feeder arm 94 forward (FIGS. 8A and 8B) and thus, pushes the collated fasteners 48 forward, and one of which into the driver channel 54A (FIGS. 5A and 5B). As such, pivoting movement of the lever 74 in the direction of arrow A0 and then a direction opposite arrow A0 as described above defines a complete reloading cycle of one of the collated fasteners 48 into the driver channel 54.

In an alternative embodiment of the fastener driver (not shown), the pusher mechanism 58 may be actuated by the impact of the driver blade 26 upon reaching the driven position. As the driver blade 26 moves from the ready position to the driven position, the driver blade 26 may either directly contact or indirectly contact (e.g., via an arm or linkage, not shown) the roller 78, which imparts pivotal motion to the lever 74. As described above, the pivotal motion imparted on the lever 74 displaces the sliding body 90 and feeder arm 94 along arrow A2, allowing the feeder arm 94 to pick up the next fastener 48 in the collated strip. Thereafter, the torsion spring acting on the lever 74 rebounds, pivoting the lever 74 in the direction of arrow A0 and displacing the sliding body 90 and feeder arm 94 in the direction of arrow A1 (FIG. 2), positioning another fastener 48 in the driver channel 54 as described above.

In another alternative embodiment of the fastener driver (not shown), the pusher mechanism 58 may be actuated by the impact of the piston 22 on a bumper 110 (FIG. 2) within the cylinder 18 for stopping the driver blade 26 in the driven position. The bumper 110 may either directly contact or indirectly contact (e.g., via an arm or linkage, not shown) the roller 78, which imparts pivotal motion to the lever 74. As described above, the pivotal motion imparted on the lever 74 displaces the sliding body 90 and feeder arm 94 along arrow A2, allowing the feeder arm 94 to pick up the next fastener 48 in the collated strip. Thereafter, the torsion spring acting on the lever 74 rebounds, pivoting the lever 74 in the direction of arrow A0 and displacing the sliding body 90 and feeder arm 94 in the direction of arrow A1 (FIG. 2), positioning another fastener 48 in the driver channel 54 as described above.

Figure 9:
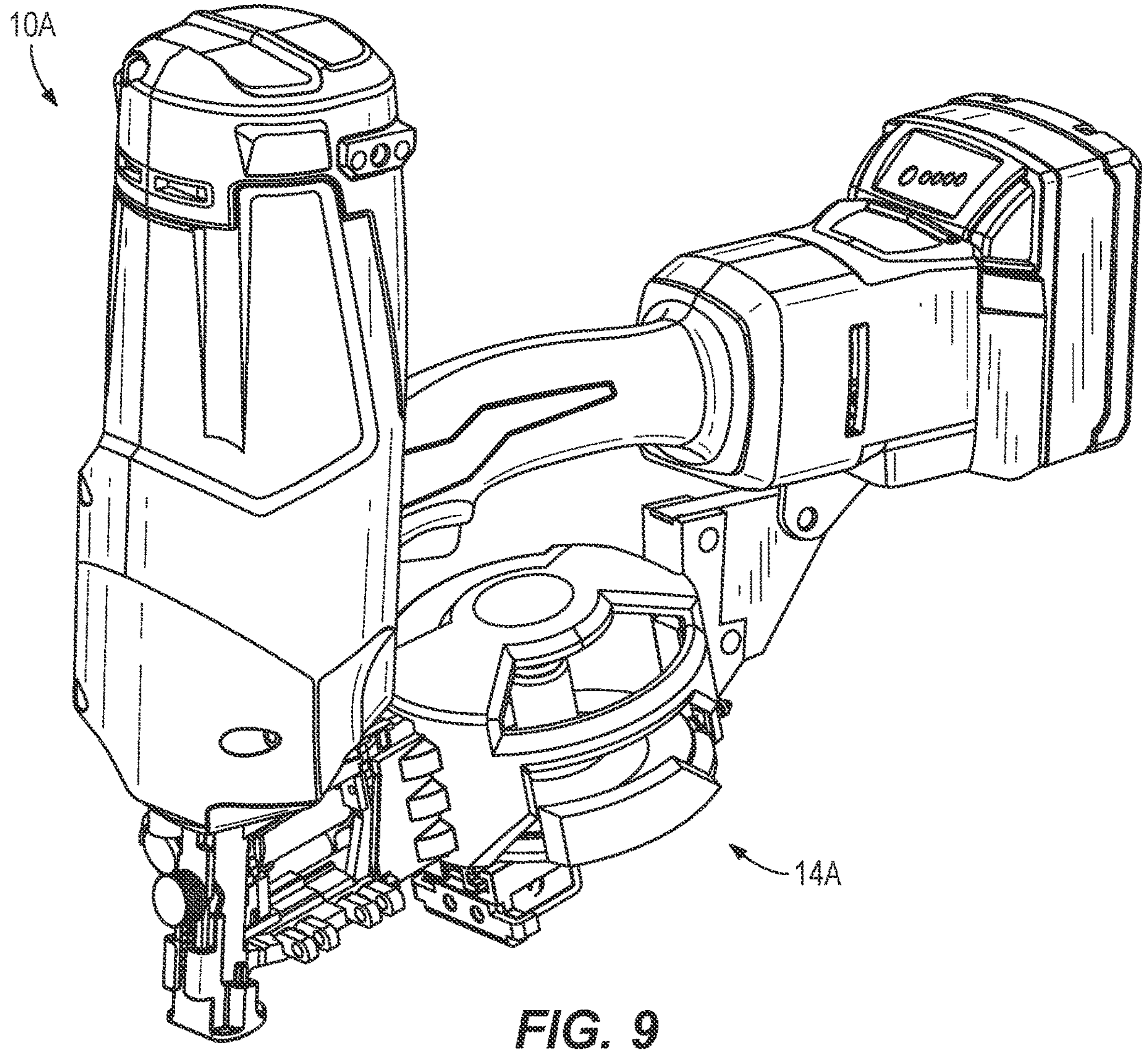
FIG. 9 is a perspective view of a powered fastener driver according to another embodiment of the invention.
Figure 10:
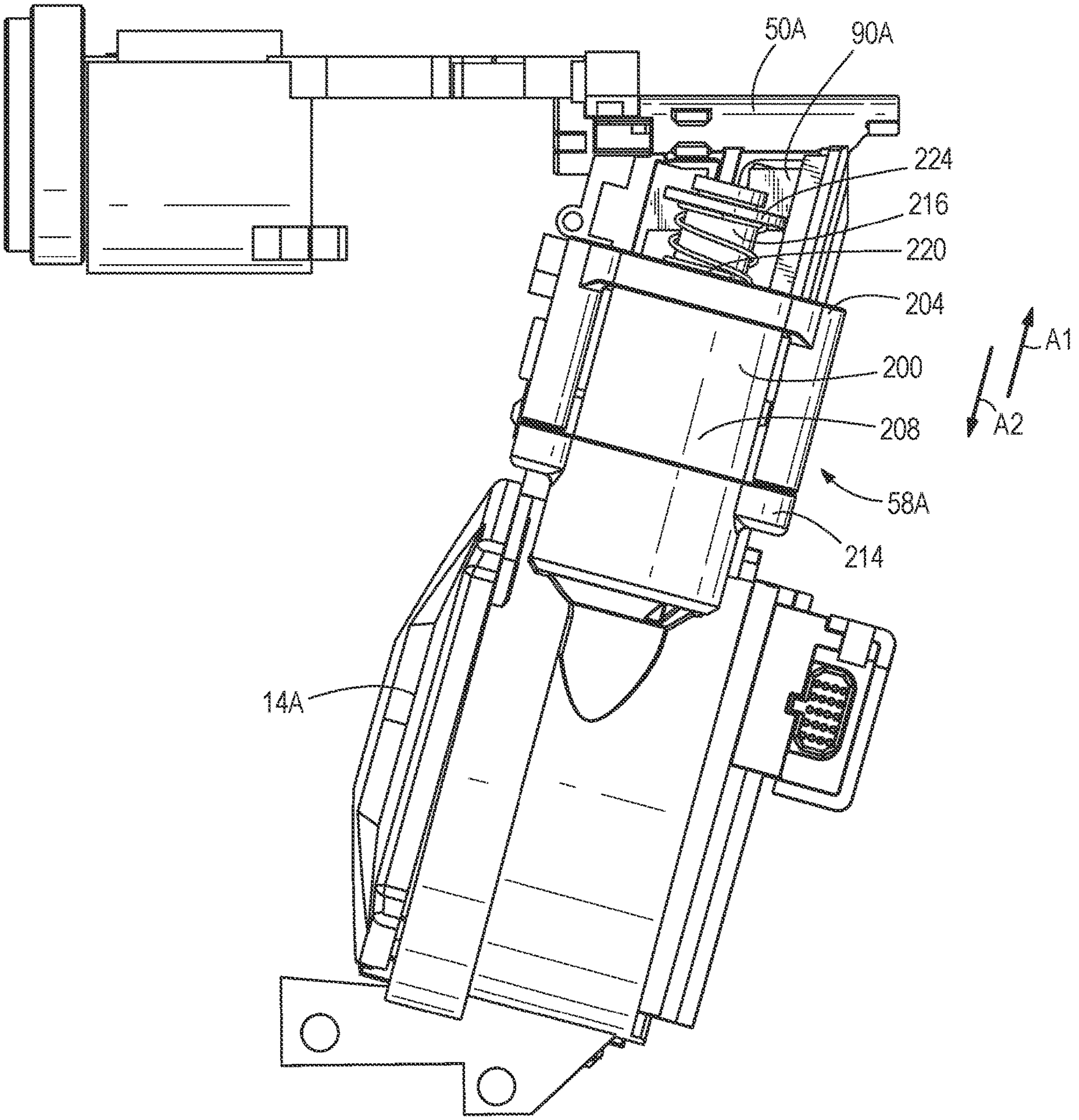
FIG. 10 is a plan view of the powered fastener driver of FIG. 9, with the housing removed, illustrating a pusher mechanism.

FIG. 9 illustrates a gas spring-powered fastener driver 10A including another embodiment of a pusher mechanism 58A. The driver 10A is similar to the driver 10 described above with reference to FIGS. 1-8. Accordingly, features and elements of the driver 10A corresponding with features and elements of the driver 10 are given like reference numbers followed by the letter 'A.' In addition, the following description focuses primarily on differences between the pusher mechanism 58A and the pusher mechanism 58.

Figure 11:
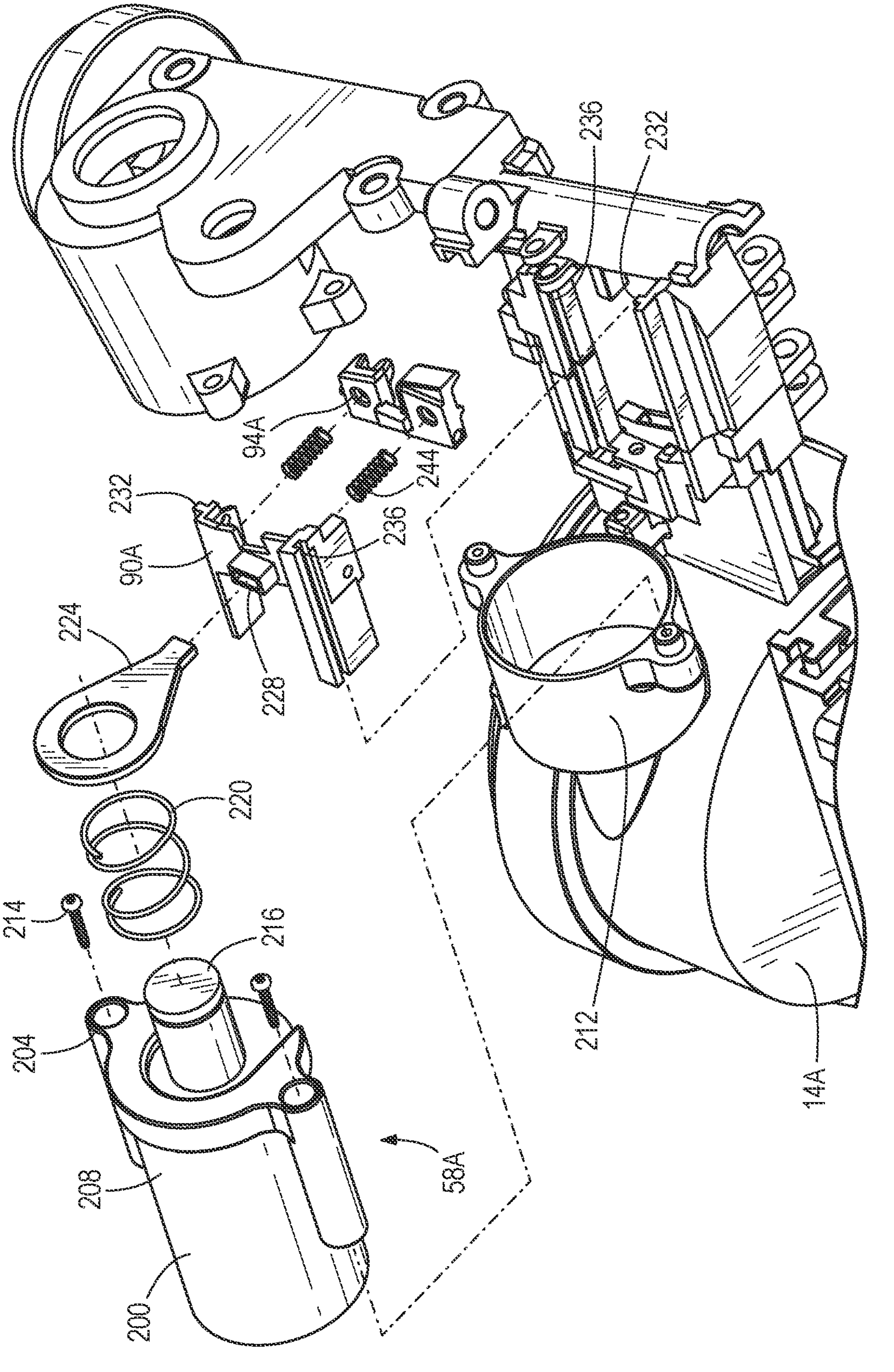
FIG. 11 is an exploded front perspective view of the pusher mechanism of FIG. 10.

Similar to the driver 10, the driver 10A includes a lifting mechanism 42A that returns a piston 22A and a driver blade 26A to the ready position by energizing a motor 46A. The pusher mechanism 58A differs from the pusher mechanism 58 in that the pusher mechanism 58A is not driven in sync with the lifting mechanism 42A by a gear train. Rather, the pusher mechanism 58A includes a solenoid 200 (FIG. 11) coupled to the canister magazine 14A via a bracket 204 clamping a solenoid housing 208 to a mount portion 212 of the canister magazine 14A. The bracket 204 is fastened to the mount portion 212 of the canister 14A via a plurality of fasteners 214 or the like. A plunger 216 is disposed within the solenoid housing 208 and is movable between an extended position and a retracted position. In the extended position, a plunger spring 220 disposed around the plunger 216 biases the plunger 216 from the solenoid housing 208. In the retracted position, the solenoid 200 is engaged, meaning an electromagnet attracts the plunger 216 within the solenoid housing 208, against the bias of the spring 220. A plate 224 is coupled to an end of the plunger 216 such that movement of the plunger 216 imparts reciprocating movement to the plate 224. The pusher mechanism 58A further includes a sliding body 90A, which has an opening 228 for receiving an end of the plate 224 to secure the body 90A to the plate 224. The motion of the sliding body 90A is constrained to reciprocating linear movement in the direction of arrows A1, A2 relative to the magazine 14A by engaged guide rails 232 and grooves 236. A feeder arm 94A is pivotably coupled to the sliding body 90A about a pivot axis 99A that is perpendicular to the direction of movement of the sliding body 90A along arrows A1, A2 and is biased toward the fasteners 48 by compression springs 244. Because the feeder arm 94A is supported upon the sliding body 90A, the feeder arm 94A reciprocates with the sliding body 90A in the direction of arrows A1, A2 in response to reciprocating movement of the plunger 216.

In operation, after the driver blade 26A strikes the fastener 48, the solenoid 200 is activated, retracting the plunger 216 and, thus, sliding the body 90A away from the driver channel 54A in the direction of A1, allowing the feeder arm to pivot to clear the next fastener 48 in the sequence. When the plunger 216 is completely retracted, the body 90A is at a position farthest from the driver channel 54A, allowing the springs to bias the feeder arm behind the next fastener 48 in the sequence. At this time, the solenoid 200 is deactivated, causing the plunger spring 220 to bias the plunger 216 outward. The outward motion of the plunger 216 moves the body 90A and, in turn, the feeder arm toward the driver channel 54A. When the plunger 216 is completely extended, a forward most fastener 48 is delivered to the driver channel 54A by the feeder arm.

The system that determines when the solenoid 200 is energized is an open feedback system, meaning the system does not know the location of the lifting mechanism 42A.

Instead, once a user pulls the trigger 44, the system operates based on predetermined timing to activate and deactivate the solenoid 200.

Various features of the invention are set forth in the following claims.

What is claimed is:

1. A powered fastener driver comprising:

a housing;

a nosepiece coupled to the housing and extending therefrom;

a driver blade movable within the nosepiece between a ready position and a driven position;

a canister magazine coupled to the nosepiece in which collated fasteners are receivable; and a pusher mechanism coupled to the nosepiece for individually transferring collated fasteners in the canister magazine to a driver channel in the nosepiece in which the driver blade is movable, the pusher mechanism including a body coupled to the nosepiece for relative translation therewith, a feeder arm coupled to the body for movement therewith, and a lever pivotably coupled to the nosepiece about a pivot axis, the lever having a first end engageable with the body for imparting reciprocating translation to the body relative to the nosepiece in response to pivoting movement of the lever in opposite directions about the pivot axis; and a cam with which a second end of the lever is engaged for imparting pivoting movement to the lever;

wherein the feeder arm is engageable with individual fasteners in the nosepiece for sequentially pushing the fasteners into the driver channel in response to reciprocation of the body relative to the nosepiece.

2. The powered fastener driver of claim 1, wherein the lever includes a second end opposite the first end, and wherein the lever is pivotably coupled to the nosepiece about the pivot axis between the first and second ends of the lever.

3. The powered fastener driver of claim 1, further comprising a lifting mechanism operable to move the driver blade from the driven position toward the ready position.

4. The powered fastener driver of claim 3, further comprising a gear train for providing torque to the lifting mechanism, causing the lifting mechanism to rotate, wherein the cam also receives torque from the gear train, causing the cam to rotate in unison with the lifting mechanism.

5. The powered fastener driver of claim 1, wherein the pusher mechanism includes a spring that biases the body toward the driver channel in the nosepiece.

6. The powered fastener driver of claim 5, wherein the pusher mechanism includes a roller coupled to the second end of the lever, and wherein the spring continuously maintains the roller in contact with the cam as the cam rotates.

7. The powered fastener driver of claim 1, wherein the body includes a pivot pin received by the first end of the lever.

8. The powered fastener driver of claim 1, wherein the body includes a slot in which a corresponding guide rail on the nosepiece is received, thereby limiting movement of the body to translation relative to the nosepiece.

9. The powered fastener driver of claim 1, wherein the feeder arm is pivotable relative to the body about a pivot axis that is perpendicular to a direction of movement of the body.

10. A powered fastener driver comprising:

a housing;

a motor positioned in the housing;

a nosepiece coupled to the housing and extending therefrom;

a driver blade movable within the nosepiece between a ready position and a driven position;

a canister magazine coupled to the nosepiece in which collated fasteners are receivable;

a lifting mechanism positioned within the housing and operable to move the driver blade from the driven position toward the ready position;

a pusher mechanism coupled to the nosepiece for individually transferring collated fasteners in the canister magazine to a driver channel in the nosepiece in which the driver blade is movable, the pusher mechanism including a body coupled to the nosepiece for relative translation therewith, a feeder arm pivotably coupled to the body for movement therewith, and a lever pivotably coupled to the nosepiece about a pivot axis, the lever having a first end engageable with the body for translating the body relative to the nosepiece in response to pivoting movement of the lever in opposite directions about the pivot axis, and an opposite, second end;

a cam with which the second end of the lever is engaged; and a gear train operable to receive torque from the motor and distribute torque to the lifting mechanism and the cam, causing the cam to rotate and impart pivoting movement to the lever, which translates the body of the pusher mechanism relative to the nosepiece;

wherein the feeder arm is engageable with individual fasteners in the nosepiece for sequentially pushing the fasteners into the driver channel in response to reciprocation of the body relative to the nosepiece.

11. The powered fastener driver of claim 10, wherein the pivot axis is located between the first and second ends of the lever.

12. The powered fastener driver of claim 11, wherein the pusher mechanism includes a spring that biases the body toward the driver channel in the nosepiece, wherein the pusher mechanism includes a roller coupled to the second end of the lever, and wherein the spring continuously maintains the roller in contact with the cam as the cam rotates.

13. The powered fastener driver of claim 12, wherein the cam includes a valley and a peak, and wherein one revolution of the cam during which the roller transitions from the valley to the peak, and then back to valley, coincides with one cycle of reciprocation of the body relative to the nosepiece.

14. The powered fastener driver of claim 10, wherein a fork is defined by the first end of the lever, and wherein the body includes a pivot pin received by the first end of the lever.

15. The powered fastener driver of claim 10, wherein the body includes a slot in which a corresponding guide rail on the nosepiece is received, thereby limiting movement of the body to translation relative to the nosepiece.

16. The powered fastener driver of claim 10, wherein the gear train synchronously rotates the cam and the lifting mechanism in response to a torque input from the motor.

17. The powered fastener driver of claim 16, further comprising a transmission between the motor and the gear train, wherein the gear train includes a first gear set coupled between a transmission output shaft and the lifting mechanism.

18. The powered fastener driver of claim 17, wherein the gear train includes a second gear set coupled between the lifting mechanism and the cam.

19. The powered fastener driver of claim 18, wherein the first and second gear sets are on opposite sides of the nosepiece.

20. The powered fastener driver of claim 18, wherein each of the first gear set and the second gear set includes a reduction ratio of 1:1.

* * * * *